L. T. RICHARDSON.
Making Metal Tools.

No. 13,101.

Patented June 19, 1855.

UNITED STATES PATENT OFFICE.

L. T. RICHARDSON, OF WORCESTER, MASSACHUSETTS.

SOCKET-HANDLE FOR CHISELS.

Specification of Letters Patent No. 13,101, dated June 19, 1855.

*To all whom it may concern:*

Be it known that I, LOVELL T. RICHARDSON, of Worcester, in the county of Worcester and State of Massachusetts, have invented a new and useful Improvement in the Construction of Socket-Handles for Chisels and other Tools or Implements; and I do hereby declare that the following is a full, clear, and exact description of the same, reference being had to the annexed drawings, making a part of this specification, in which—

Figure 1:
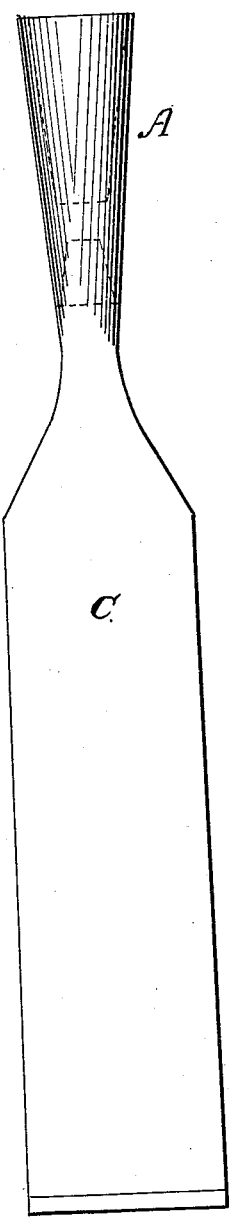
Figure 2:
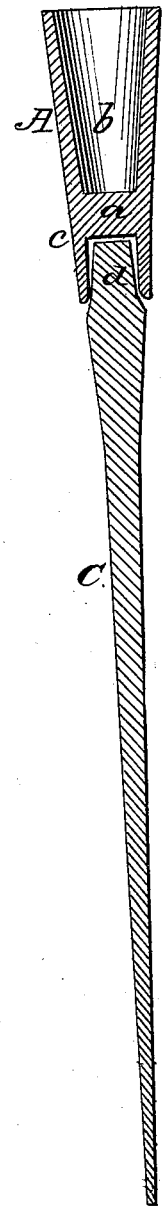
Figure 3:
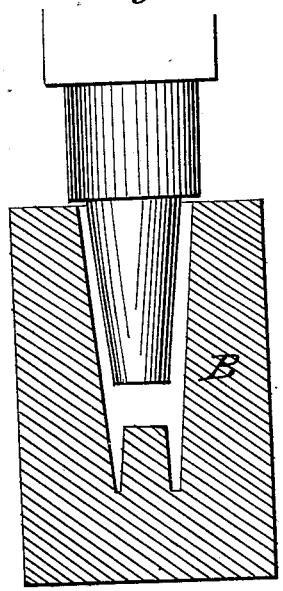

Figure 1, is a face or side view of a chisel with a socket constructed according to my improved mode. Fig. 2, is a longitudinal vertical section of ditto. Fig. 3, is a transverse vertical section of a die showing the manner in which the sockets are formed.

Similar letters of reference indicate corresponding parts in the several figures.

The nature of my invention consists in forming the sockets with a die of proper construction, said sockets having a partition or ledge within them which divides or separates the recess for the reception of the handle, from the recess for the reception of the shank of the tool or implement, the partition or ledge when the socket and shank are welded together, uniting with the end of the shank and thereby forming a perfect and strong connection between the socket and the tool or implement.

To enable others skilled in the art to fully understand and construct my invention I will proceed to describe it.

A represents the socket which is externally of the usual form. The socket is formed of a piece of iron struck into the desired shape or form by a die B, as shown in red Fig. 3. The die is so constructed that a transverse partition or ledge (a) see Fig. 2, is left within the socket, said partition or ledge dividing the recess (b) which receives the handle from the recess (c) which receives the shank of the tool. This partition or ledge is somewhat thicker than the sides of the socket.

C represents a chisel and (d) is its shank which is fitted within the recess (c) and welded therein to the socket. The partition or ledge (a) as well as the sides of the socket forming the recess (c) unites during the process of welding with the shank (d) and a perfect and strong connection is obtained.

The ordinary mode of construction consists in forging the socket of sheet metal, welding the joint, and then inserting the shank within the smaller end and welding it to the socket. It will readily be seen that a very imperfect connection is formed thereby because the shank has a very small bearing within the socket and also because there is not a sufficient body or weight of metal at the smaller end of the socket to be incorporated with the shank, consequently the cheaper and inferior tools and implements only are made with iron sockets, the better sorts having their sockets forged out from the same piece of steel as the blade and at the same time. This latter process enhances the cost of the tool exceedingly for the socket, which would answer equally well if made of iron, provided a strong and durable connection could be made, requiring considerable steel for its construction. My improvement therefore will reduce the cost of superior tools, because in forming the sockets by means of a die much labor is dispensed with and a better socket than usual obtained for no welded joint is required, the sockets being struck from a single piece of iron, and the connection is strong and durable equally so as if the shank were forged from the same piece of metal as the blade on account of the transverse partition or ledge being formed in the socket so as to give a sufficient body or weight of metal to the socket at the point of union of the socket and shank.

I do not claim a die of any particular form neither do I claim simply forming or constructing sockets by means of a die for dies are used for analogous purposes, but

What I claim as new and desire to secure by Letters Patent, is, constructing the sockets A, with a die so formed, that a transverse partition or ledge (a) is left within the socket, said partition or ledge dividing the recess (b) which receives the handle of the implement from the recess (c) which receives the shank, so as to obtain a sufficient body or weight of metal at that part of the socket which is welded to the shank (d) of the tool or implement for the purpose of forming a strong and durable connection of the socket and shank as herein set forth.

LOVELL T. RICHARDSON.

Witnesses:
JULIUS GUNTHER,
WM. H. HARRINGTON.